(No Model.)

G. A. WILLIAMS.
COFFEE POT.

No. 444,572. Patented Jan. 13, 1891.

Witnesses:
J. H. Course
H. C. Lee.

Inventor,
George A. Williams
By Dewey & Co.
Attys

UNITED STATES PATENT OFFICE.

GEORGE A. WILLIAMS, OF SAN FRANCISCO, CALIFORNIA, ASSIGNOR OF ONE-HALF TO FRANK JONES, OF SAME PLACE.

COFFEE-POT.

SPECIFICATION forming part of Letters Patent No. 444,572, dated January 13, 1891.

Application filed September 12, 1890. Serial No. 364,773. (No model.)

*To all whom it may concern:*

Be it known that I, GEORGE A. WILLIAMS, a citizen of the United States, residing in the city and county of San Francisco, State of California, have invented an Improvement in Coffee-Pots; and I hereby declare the following to be a full, clear, and exact description of the same.

My invention relates to an improved construction for coffee-pots.

It consists of a cylindrical outer chamber, a second cylindrical chamber adapted to telescope within the outer one, in which it fits snugly, a removable clamp for the interior chamber adapted to secure within it a bottom of fibrous flexible material and a spring so fixed with relation to the two parts of the pot that the inner portion may be held at any desired point by the action of this spring.

Figure 1:
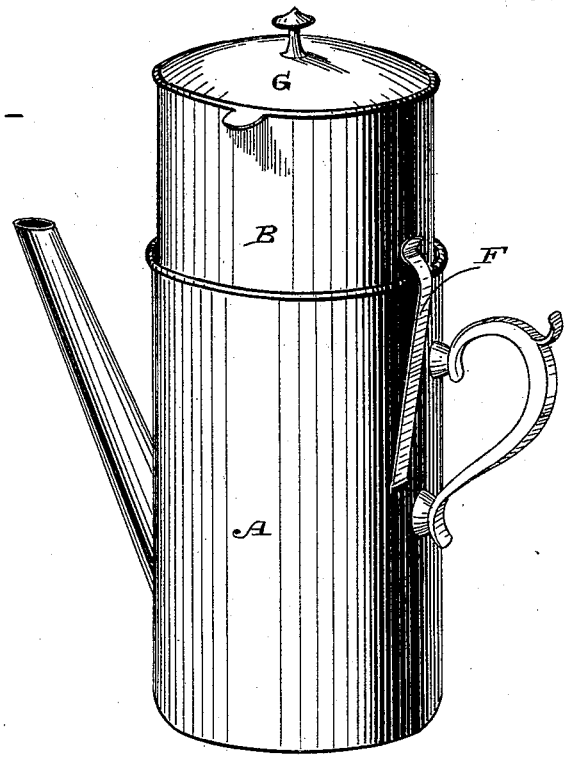
Figure 2:
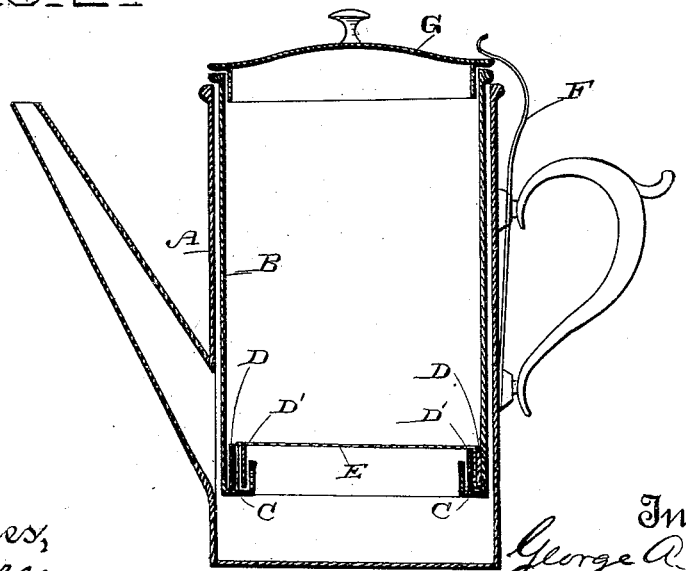

Referring to the accompanying drawings for a more complete explanation of my invention, Figure 1 is an exterior view of the coffee-pot, showing the interior section raised and held in place by the spring. Fig. 2 is a vertical section taken through the central line showing the construction of the parts.

A is the outer containing portion of my coffee-pot, which may be made of any suitable size and is cylindrical in form.

B is the interior portion, which is also made cylindrical and of a size just sufficient to slip easily within the outer containing portion A. The portion B has a flange C turned inwardly around the bottom, and this flange serves to hold the clamping-rings of the false bottom in place. These rings D D' are made to slip one over the other, the outer one having sufficient diameter to drop inside the bottomless section B, and adapted to rest upon the flange C at the bottom of the section B. The inner ring is sufficiently smaller than the outer one to admit a piece of fine flannel cloth E or other suitable fibrous or textile material to be clamped between the two, the cloth being sufficiently larger than the diameter of the rings, so that its edges will turn up and be clamped between these rings while the cloth is stretched across the bottom of the rings, and being clamped between the two it is held sufficiently tight for the desired purpose.

The cloth being secured in place between the rings, they are then dropped into the section B, resting upon the bottom flange C, as shown, and in this condition the inner section is ready to receive the coffee.

Upon the side of the outer containing vessel A is secured a spring F, the end of which extending above the top of the vessel A is so bent as to press against the side of the vessel B when the latter is raised within the vessel A, or when the vessel B is pressed down so that its upper rim rests upon the upper rim of the vessel A and the cover G is in place the upper end of the springs retains them by pressing above the upper edges thereof.

The vessel B does not extend quite to the bottom of the vessel A, and when coffee is to be made therein a suitable quantity is placed in the vessel B, resting upon the fibrous bottom, and water is poured in until the outer and inner vessels are filled up to the desired point. The coffee within the inner vessel then remains submerged in the water until the extract has been made of sufficient strength, after which the inner chamber B may be raised up within the outer one until the bottom is above the surface of the contained liquid, and whatever of the extract remains within the inner vessel will slowly filter through into the outer vessel A, where it remains a perfectly clear liquid, ready to be poured off through the spout and out of contact with the coffee-grounds which are contained within the inner vessel.

It will be manifest that whenever desired the inner vessel may be entirely lifted out of the outer one, and the cover can then be placed upon the outer vessel, the curved spring acting to hold it in place and prevent its falling off, which might otherwise occur on account of its being somewhat smaller than the outer vessel.

Having thus described my invention, what I claim as new, and desire to secure by Letters Patent, is—

1. A coffee-pot consisting of the cylindrical outer containing vessel, a corresponding cylindrical bottomless inner chamber fitted to telescope within the outer one, and having an inwardly-turned flange at the bottom, a plural number of concentric clamping-rings fitted one within the other and adapted to rest their edges upon said flange, and a bottom composed of a plural number of fibrous or textile material clamped between said rings, substantially as herein described.

2. A coffee-pot consisting of the cylindrical outer containing vessel, a corresponding bottomless cylinder of smaller diameter fitted to telescope within the outer vessel, having an inwardly-turned flange at the bottom, concentric rings fitted within the inner cylinder so as to rest upon the flange, and a bottom of fibrous or textile material stretched across the rings and having its edges clamped between them so as to form a bottom for the inner cylinder, in combination with a spring fixed on the outside of the outer vessel and adapted to press upon the side of the inner cylinder and to hold it at any desired point when raised within the outer cylinder, substantially as herein described.

In witness whereof I have hereunto set my hand.

GEORGE A. WILLIAMS.

Witnesses:
GEO. H. STRONG,
FRANK JONES.